United States Patent [19]
Weiss et al.

[11] Patent Number: 5,337,316
[45] Date of Patent: Aug. 9, 1994

[54] TRANSCEIVER SELF-DIAGNOSTIC TESTING APPARATUS AND METHOD

[75] Inventors: Kenneth P. Weiss, Palatine; Mario F. DeRango, Lake Zurich; Daniel R. Schroeder, Carol Stream; Leslie D. Mutz, Barrington; Brian W. Lacy, Addison; Mark D. Chapman, Marengo, all of Ill.

[73] Assignee: Motorola, Inc., Schaumburg, Ill.

[21] Appl. No.: 829,802

[22] Filed: Jan. 31, 1992

[51] Int. Cl.$^5$ .............................................. G06F 11/00
[52] U.S. Cl. .................................. 371/20.5; 371/20.1; 375/10
[58] Field of Search ..................... 371/20.5, 20.1, 20.3, 371/20.4; 370/13, 15, 16; 375/10

[56] References Cited

U.S. PATENT DOCUMENTS

| | | | |
|---|---|---|---|
| 5,069,521 | 12/1991 | Hardwick | 370/16 |
| 5,128,962 | 7/1992 | Kerslake et al. | 375/10 |
| 5,146,474 | 9/1992 | Nagler et al. | 371/20.5 |
| 5,265,089 | 11/1993 | Yonehara | 371/20.4 |

Primary Examiner—Robert W. Beausoliel, Jr.
Assistant Examiner—Joseph E. Palys
Attorney, Agent, or Firm—Darleen J. Stockley

[57] ABSTRACT

The present invention includes an apparatus and a method for transceiver self-diagnostic testing in a communication system. A feedback unit (228, 326) is utilized that allows performance of a loopback test independent of a transmit frequency to receive frequency difference without undue proliferation of circuitry.

12 Claims, 5 Drawing Sheets

TRANSCEIVER SELF-DIAGNOSTIC TESTING APPARATUS AND METHOD

FIELD OF THE INVENTION

The present invention relates generally to transceiver self-diagnostic testing systems and more particularly to such systems having a loopback function.

BACKGROUND

A radio communication system that employs a duplex transceiver typically employs a transceiver radio frequency (RF) self-diagnostic testing system that mixes a transmitter output with a fixed local oscillator output to obtain a signal with a frequency band of approximately 800 MHz to test for proper operation of a receiver. Present such systems utilize only the frequency band at approximately 800 MHz for which a single transmit to receive (T/R) frequency spacing is defined, and thus utilize a particular matched difference frequency loopback oscillator system based on that desired T/R spacing.

At ultra-high frequencies (UHF) and very high frequencies (VHF) no such fixed spacing is defined for present systems. Thus, selection of a self-diagnostic testing system that utilizes other than an approximately 800 MHz frequency band would require matching of a difference frequency loopback oscillator system individually with each selected channel transmission/reception (T/R) frequency spacing. Thus, selection from an unlimited number of T/R frequency spacings would require an unlimited number of loopback systems. Even provision of selection from a number of T/R frequency spacings would require an unwieldy number of loopback systems. Thus, there is a need for a transceiver self-diagnostic testing system that, while providing for selection of a plurality of channel transmission/reception (T/R) frequency spacings, also minimizes a need for a large number of loopback systems.

SUMMARY OF THE INVENTION

An apparatus and method for transceiver self-diagnostic testing in a communication system are provided. The invention includes at least a transmitter-control unit-receiver unit that includes at least a transmitter, a control unit, and a receiver, and also includes a feedback unit, a switching unit, and one of a duplexing means that is operably coupled to a single antenna, and first and second antennas. Where selected, the duplexing unit is operably coupled to the switching unit, to the single antenna, and to the receiver, for permitting alternate transmission and reception by the antenna. Where the duplexing unit is unselected, the first antenna is operably coupled to the switching unit for transmission of signals, and the second antenna is operably coupled to the feedback unit for receiving signals. The transmitter is operably coupled to send at least a first signal having a carrier frequency and, where selected, a modulated data bit test pattern, to a switching unit. The control unit is operably coupled to provide control signals to at least one of: the transmitter, the receiver, and the feedback unit that provides at least a first feedback signal, and the receiver is operably coupled to receive at least the first feedback signal of the feedback unit and to receive at least a first transmitted signal having a carrier frequency.

The switching unit is operably coupled to the control unit, and to one of the first antenna and the duplexing unit, for controlling transmission of at least the first signal to the operably coupled antenna. The feedback unit is operably coupled to the transmitter for providing a feedback signal that has a frequency that is substantially one of: (1) a difference between the first signal carrier frequency and the predetermined difference frequency between the first signal carrier frequency and the received signal carrier frequency, and (2) a predetermined loopback frequency common to the transmitter and the receiver. The control unit is operably coupled to the transmitter, to the receiver, to the feedback unit, for, where at least one of the transmitter and the receiver further includes a synthesizer, opening the switching unit for a preselected test time period, programming the synthesizer for one of: (A) providing an adjusted carrier frequency to at least one of the transmitter and the receiver for maintaining a predetermined difference frequency between the first signal carrier frequency and the received signal carrier frequency, and (B) where both the transmitter and the receiver each have a synthesizer, the synthesizers providing a predetermined loopback frequency to the transmitter and the receiver. Where the switching unit is open (preventing transmission), the control unit sets the feedback unit to provide a feedback signal that is one of: (1) the difference between the first signal carrier frequency and the predetermined difference frequency between the first signal carrier frequency and the received signal carrier frequency, and (2) the predetermined loopback frequency common to the transmitter and the receiver, such that the control unit monitors one of:

- a difference between the modulated data bit pattern for the first signal and a demodulated data bit pattern for the feedback signal to determine bit errors, and
- a magnitude of the feedback signal accepted by the receiver.

DETAILED DESCRIPTION OF A PREFERRED EMBODIMENT

The present invention provides for performance of self-diagnostic radio frequency (RF)loopback testing independent of transmitter-receiver frequency spacing, thus allowing difference frequency spacing selection while minimizing additional hardware requirements. This invention also provides for utilization of UHF and VHF, frequencies not previously usable with such a self-diagnostic system.

Figure 1:
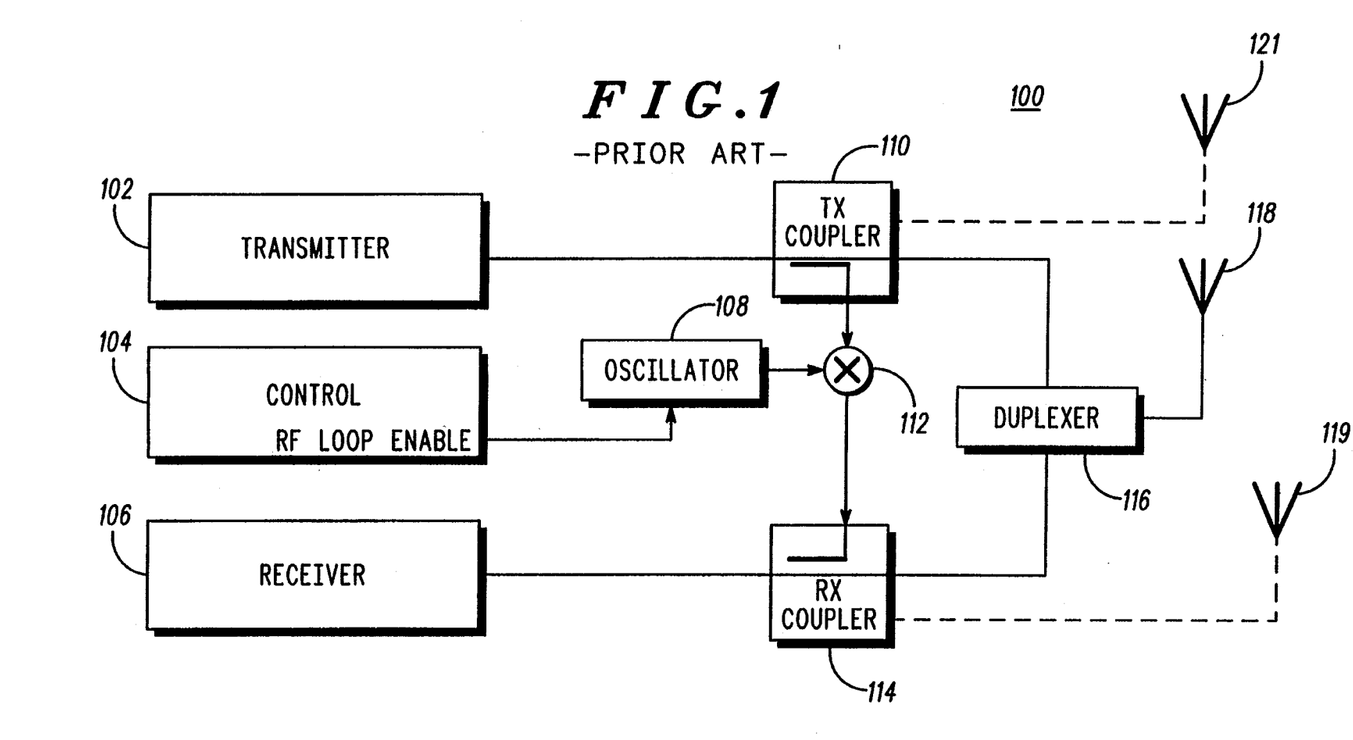
FIG. 1, numeral 100, is a block diagram of a self-diagnostic RF loopback system using a mixer and oscillator circuitry in accordance with implementations known in the prior art.

FIG. 1, numeral 100, is a block diagram of a self-diagnostic RF loopback system using a mixer and oscillator circuitry in accordance with implementations known in the prior art. The block diagram is described, an example of frequency values for a typical prior art implementation being provided for clarity. Such a system has been utilized in the 806–825/851–870 MHz frequency band for which a frequency spacing difference between transmitters and receivers is 45 MHz. Typically a transmitter (102) provides a signal at a frequency close to 860 MHz, for example, T=856.0125 MHz. A transmitter coupler (Tx Coupler) (110) couples the transmitter (102) to a mixer (112) and to a duplexer (116). The transmitter (102)is typically coupled to a control section (104), which is operably coupled to an oscillator (108) and to a receiver (106) such that the control section (104) provides a radio frequency loopback enable control signal to the oscillator (108). The oscillator (108) is typically set to provide a difference frequency, for example, 45 MHz. At the mixer (112) the signal is mixed with the difference frequency to provide a received frequency R, here R being equal to T−45 MHz. A receiver coupler (Rx Coupler) (114) couples the receiver (106) to the mixer (112) and to the duplexer(116). Alternatively, two antennas (121,119) were utilized, one coupled to the transmitter coupler (110), and the other coupled to the receiver coupler (114).

It should be noted that in the prior art example above the duplex transceiver accomplished a RF loopback self-diagnostic test wherein a fixed local oscillator at a 45 MHz difference frequency was enabled by an enabling signal from the transceiver control section, the frequency of the local oscillator was mixed with a sample of the transmit carrier signal such that an output at the difference frequency (equal to a receive frequency) was produced, and a resultant signal was then coupled into a receive path, and the resultant RF loopback path was verified, typically a control unit generates a data bit pattern which is modulated at the transmitter and monitors the demodulated data bit pattern from the receiver for errors.

Figure 2:
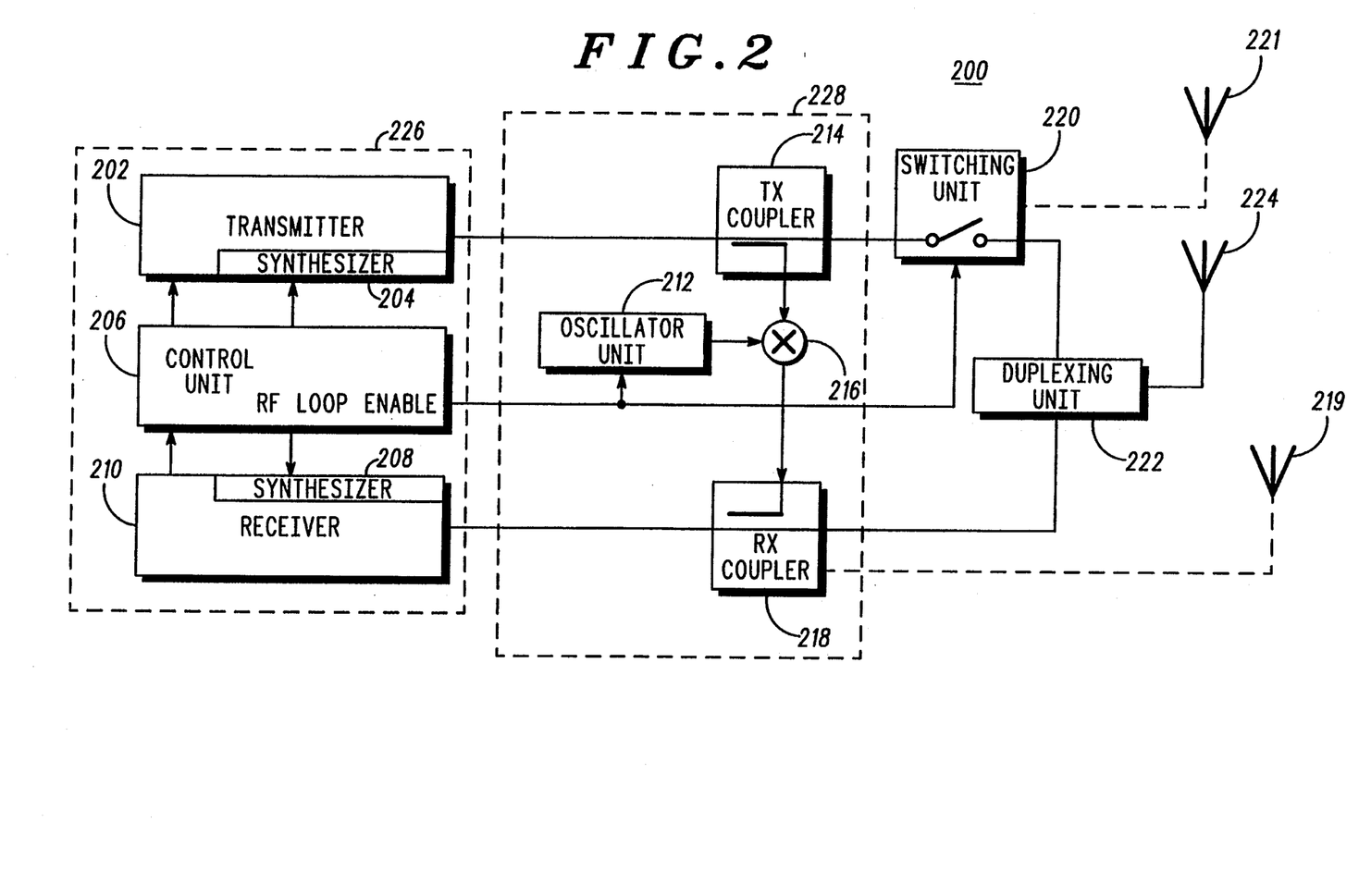
FIG. 2, numeral 200, is a block diagram of a first embodiment of an apparatus in accordance with the present invention.

FIG. 2, numeral 200, is a block diagram of a first embodiment of an apparatus in accordance with the present invention. The invention provides for transceiver self-diagnostic testing in a communication system and comprises at least a transmitter-control unit-receiver unit (226), a feedback unit (228), a switching unit (220), and one of:

a single antenna (224) and a duplexing unit (222), and first and second antennas (219, 221).

The transmitter-control unit-receiver unit (226), typically comprises at least a transmitter (202), a transmit synthesizer (204), a control unit (206), a receiver synthesizer (208), and a receiver (210), wherein the transmitter (202) is operably coupled to send at least a first signal having a carrier frequency and, where selected, test information (typically one of: (a) a modulated data bit test pattern, (b) a tone, and (c) a tone sequence)to the switching unit (220). The control unit (206) is operably coupled to provide control signals to at least one of: the transmitter (202), the receiver (210), the transmitter synthesizer (204), the receiver synthesizer (208), and the feedback unit (228) that provides at least a first feedback signal. The control unit (206) also provides the test information (for example, the information cited above) to the transmitter (202). The receiver (210) is operably coupled to receive the at least first feedback signal of the feedback unit (228) and to receive at least a first transmitted signal having a carrier frequency. The receiver provides an indication of a magnitude of accepted feedback signals to the control unit (206). The receiver (210) also provides received test information to the control unit (206). Received test information typically comprises one of: (a) a demodulated data bit pattern, (b) a received tone, and (c) a received tone sequence.

The switching unit (220) is operably coupled to the control unit (206) and to one of: a duplexing unit (222) that is operably coupled to a single antenna (224), and a first antenna (221), for controlling transmission of at least the first signal to the operably coupled antenna. In particular, the switching unit (220) is utilized to prevent radio frequency (RF) power from reaching a transmit antenna (224, 221) during each preselected test period. Where the duplexing unit (222) is unselected, the second antenna (219) is operably coupled to a second directional coupler (Rx coupler)(218) of the feedback unit (228) for providing received signals.

Where the switching unit (220) is coupled to the duplexing unit (222), the duplexing unit (222) is further coupled to the single antenna (224), and to the receiver (210) via the second directional coupler (Rx coupler)(218), for permitting alternate transmission and reception by the single antenna (224).

The feedback unit (228) is operably coupled to the transmitter (202). In the first embodiment the feedback unit (228) comprises at least a first directional coupler (Tx Coupler) (214), a mixing unit (216), an oscillator unit (212), and the second directional coupler (Rx Coupler) (218). The first directional coupler (Tx Coupler) (214) is operably coupled to the mixing unit (216) that is operably coupled to the oscillator unit (212), for, where the switching unit (220) is open for a preselected test time period, utilizing a predetermined difference frequency provided by the oscillator unit (212) to provide the difference between the first signal carrier frequency and the predetermined difference frequency between the first signal carrier frequency and the received signal carrier frequency to the receiver (210) utilizing the second directional coupler (Rx Coupler) (218) that is operably coupled to the receiver (210).

The control unit (206) is operably coupled to the transmitter (202), to the receiver (210), to the feedback unit (228), for, where at least one of the transmitter (202) and the receiver (210) further includes a synthesizer (204, 208): (1) opening the switching unit (220) for a preselected test time period, (2) programming at least one of the synthesizers (204, 208) for one of: (a) providing an adjusted carrier frequency to at least one of the transmitter (202) and the receiver (210) for maintaining a predetermined difference frequency between the first signal carrier frequency and the received signal carrier frequency, and (b)where both the transmitter (202) and the receiver (210) each have a synthesizer (204, 208), the synthesizers (204, 208) providing a predetermined loopback frequency to the transmitter (202) and the receiver (210), (3) where the switching unit (220) is open (preventing transmission), setting the feedback unit (228) to provide a feedback signal that is one of: (a) the difference between the first signal carrier frequency and the predetermined difference frequency between the first signal carrier frequency and the received signal carrier frequency, and (b) the predetermined loopback frequency common to the transmitter (202) and the receiver (210), such that the control unit (206) monitors one of: (A) a difference between the transmitted test information (typically one of: a data bit pattern, a tone, and a tone sequence) for the first signal and received test information (typically one of: a demodulated data bit pattern, a received tone, and a received tone sequence) for the feedback signal to determine bit errors, and (B) a magnitude of the feedback signal accepted by the receiver.

Thus, for example, where the transmitter (202) transmits a first signal at a frequency T that changes to frequency T', the switching unit (220) is opened for a preselected test time period, the oscillator unit (212) is set to a predetermined difference frequency D, the mixing unit (216) mixes the first signal with D and provides a received signal, formerly R, having a frequency R'=T'−D to the receiver (210). That is, where D is predetermined to be 3 MHz, T=456.65 MHz, R=451.65 MHz, T'=454.65 MHz, and R'=451.65 MHz, the synthesizer in the transmitter (204) may be programmed to maintain the difference D (3 MHz) by adjusting the transmitter carrier frequency to 454.65 MHz. Similarly, the synthesizer in the receiver (210) or, alternatively, the combination of both said synthesizers (204, 208) may be programmed to maintain the difference D. Generally the transmitter (202) has a broader frequency bandwidth, and may be moved farther from its original frequency than may the receiver (210).

Thus the present invention takes advantage of the automatic transmit and receive frequency agility (programability) inherent in synthesized radios that are under microprocessor control and performs a loopback test independent of a difference between an assigned (typically, licensed) transmit signal carrier frequency and an assigned (typically, licensed) received signal carrier frequency utilizing a signal from the mixing unit (216) input into the receiver (210) to check the integrity of the loopback path.

Figure 3:
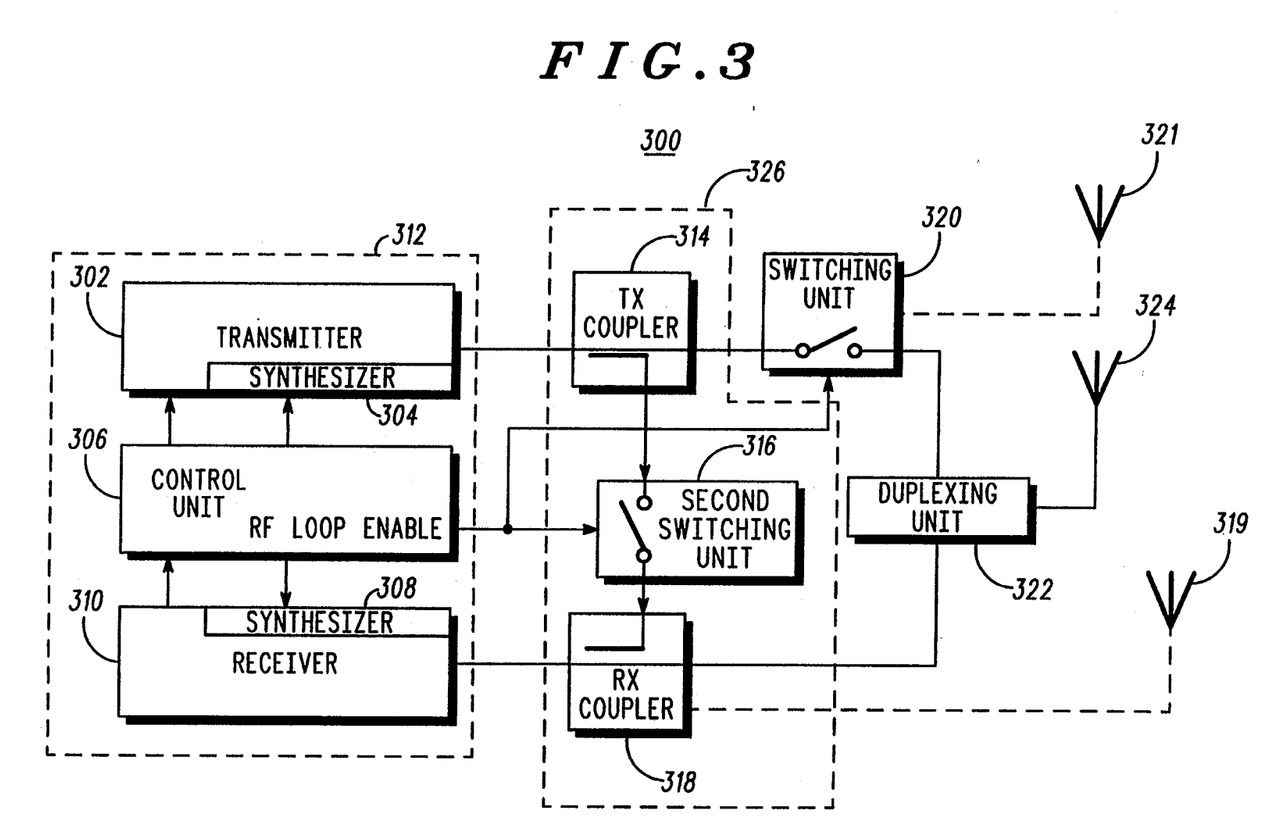
FIG. 3, numeral 300, is a block diagram of a second embodiment of an apparatus in accordance with the present invention.

FIG. 3, numeral 300, is a block diagram of a second embodiment of an apparatus in accordance with the present invention. The apparatus of the present invention may be selected such that the feedback unit (326) further includes at least a second switching unit (316) for, where the switching unit (320) is open for a preselected test time period, providing the predetermined loopback frequency common to the transmitter (302) and the receiver (310) to the receiver (310) utilizing a second directional coupler (Rx Coupler) (318) that is operably coupled to the receiver (310).

In this embodiment transmitter-control unit-receiver (312) includes at least the transmitter (302), the control unit (306), and the receiver (310), and the apparatus further includes the switching unit (320), and one of:
 a single antenna (324) and a duplexing unit (322), and first and second antennas (319, 321),
that are operably coupled as described above. The feedback unit (326) is operably coupled to the transmitter (302). In this embodiment the feedback unit (326) comprises at least a first directional coupler (Tx Coupler) (314), a second switching unit (316), and a second directional coupler (Rx Coupler) (318). The first directional coupler (Tx Coupler) (314) is operably coupled to the second switching unit (316), for, where the switching unit (320) is open for a preselected test time period, providing the predetermined loopback frequency common to the transmitter (302) and the receiver (310)to the receiver (310) utilizing a second directional coupler (Rx Coupler) (318) that is operably coupled to the receiver (310).

The control unit (306) is operably coupled to the transmitter (302), to the receiver (310), to the feedback unit (326), and performs as described above, utilizing at least one synthesizer (304, 308).

Thus, the at least first feedback signal has a frequency that is substantially one of: (1) a difference between the first signal carrier frequency and the predetermined difference frequency between the first signal carrier frequency and the received signal carrier frequency as illustrated in FIG. 2, and (2) a predetermined loopback frequency common to the transmitter and the receiver, as illustrated in FIG. 3.

The second embodiment is a special case of the first embodiment where an established loopback frequency difference is zero. Thus, in the second embodiment, the apparatus operates without a need for a dedicated mixing circuit by means of an automated process invoked by the control unit (306). Typically, a common loopback frequency (L) may be utilized where, defining T=an assigned transmitter frequency, R=an assigned receiver frequency, TBW=a transmitter electronic bandwidth without manual retuning, and RBW=a receiver electronic bandwidth without manual retuning:

Where $T \leq R$, then $R - RBW \leq L \leq T + TBW$, and where $T > R$, then $T - TBW \leq L \leq R + RBW$.

This embodiment is realizable only if $|T-R| < |TBW+RBW|$. Otherwise, establishing an effective loopback path at the loopback frequency L would require manual retuning of the transmitter and/or receiver.

Thus, the second embodiment of the present invention does not require a programmable oscillator or employ unique crystals to generate a T−R difference frequency, and provides a less hardware intensive testing apparatus than that previously known.

Figure 4:
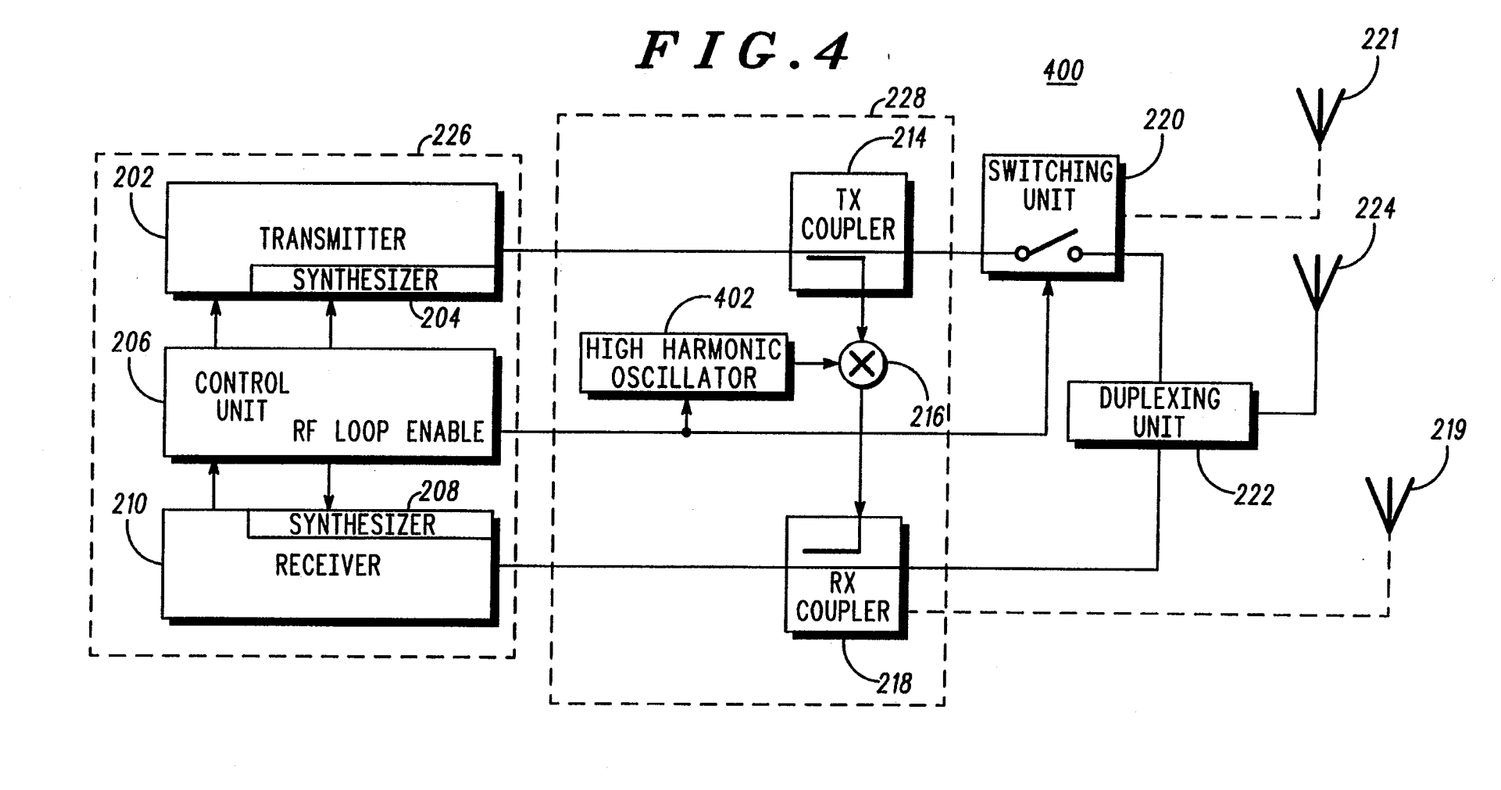
FIG. 4, numeral 400, is a block diagram of a third embodiment of an apparatus in accordance with the present invention.

FIG. 4, numeral 400, is a block diagram of a third embodiment of an apparatus in accordance with the present invention wherein the feedback unit of the first implementation further includes that the oscillator unit is a high harmonic oscillator (402) for providing a signal having high harmonic content to the mixing unit (216). For example, the high harmonic oscillator may be a 5 MHz Colpitts oscillator that is tuned to provide a signal with high harmonic content. The first and second embodiments of the present invention typically do not accommodate all possible transmitter/receiver frequency differences due to narrow tuning ranges of oscillator units. Hence, this third embodiment of the present invention accommodates all transmitter/receiver (T/R) frequency differences to be utilized with one circuit such that component/factory assembly changes are unneeded. For example, where the output of the mixing unit (216) has components at carrier frequencies (fixed harmonics) of ±5, 10, 15, 20, 25, 30, 35, 40, and 45 MHz, typical T/R frequency differences are accommodated, i.e., the control unit (206) monitors the output signal of the feedback unit (228) and, where selected, adjusts at least one of the transmitter frequency and the receiver frequency such that a difference between the said frequencies corresponds to one of the fixed harmonics of the high harmonic oscillator unit (402). Where selection of T/R frequency differences is desired to be more general than the example frequencies set forth above, at least one of the transmitter synthesizer (204) and the receiver synthesizer (208) may be selected to further include a microprocessor having control circuitry for adjusting at least one of transmitter/- receiver frequencies according to a predetermined scheme via a software algorithm in said microprocessor.

Figure 5:
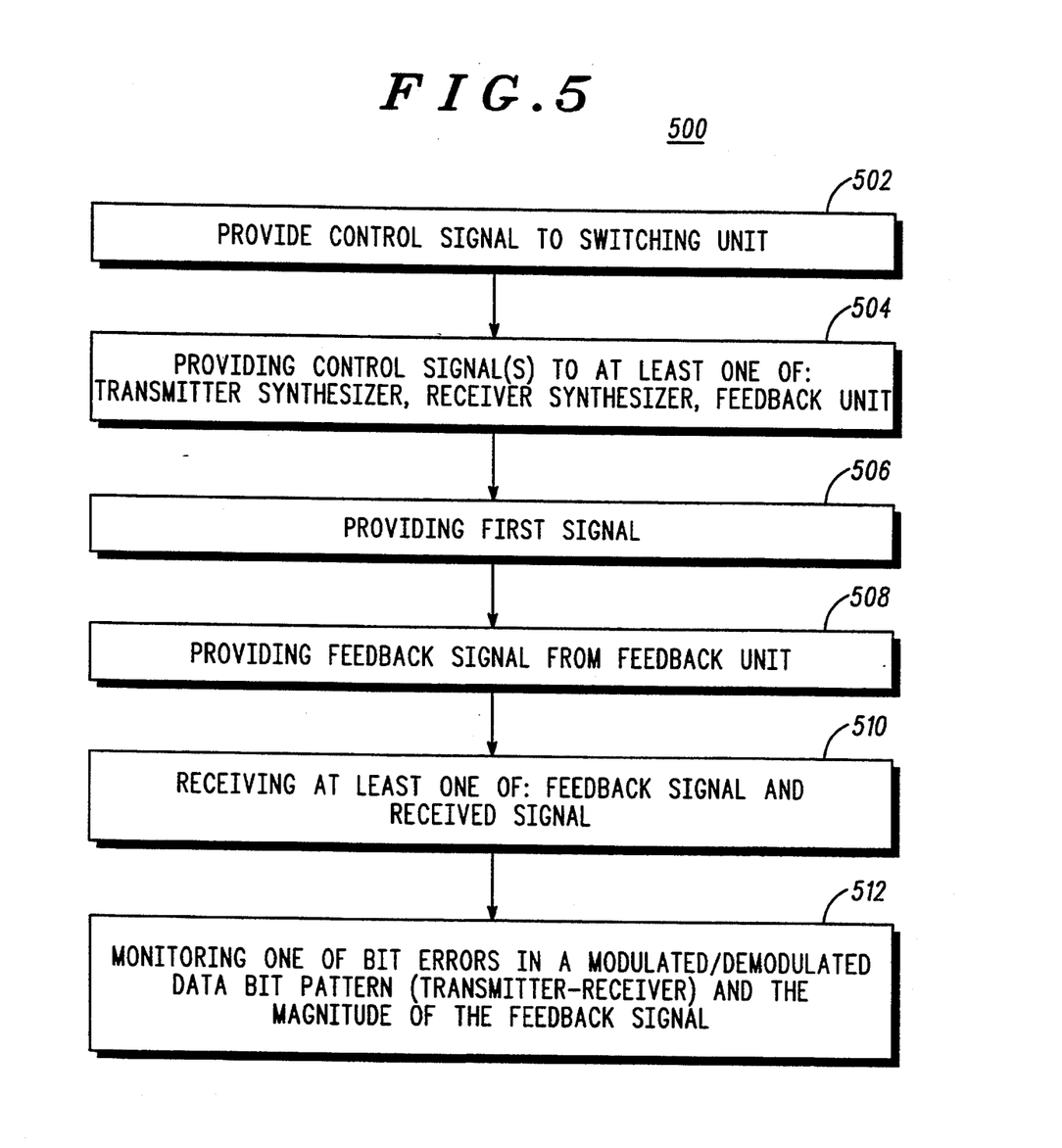
FIG. 5, numeral 500, is a flow chart setting forth steps in accordance with the method of the present invention.

FIG. 5, numeral 500, is a flow chart setting forth steps in accordance with the method of the present invention. The method comprises at least the steps of: (1) providing a control signal to a switching unit that is operably coupled to receive at least a first signal from a transmitter (502), (2) providing control signals to at least one of: a transmitter synthesizer, a receiver synthesizer, and a feedback unit that provides a feedback signal (504), (3) sending at least a first signal having a carrier frequency and, where selected, test information (for example, one of: a modulated data bit test pattern, a tone, and a tone sequence) (506), (4) providing a feedback signal from the feedback unit that has a frequency that is substantially one of: (a) a difference between the first signal carrier frequency and the predetermined difference frequency between the first signal carrier frequency and the received signal carrier frequency, and (b) a predetermined loopback frequency common to the transmitter and the receiver (508), (5) receiving at least one of the feedback signals of the feedback unit and a received signal having a carrier frequency at the receiver (510), and (6) monitoring one of: (A) a difference between the transmitted test information (typically one of: a data bit pattern, a tone, and a tone sequence) for the first signal and received test information (typically one of: a demodulated data bit pattern, a received tone, and a received tone sequence) for the feedback signal to determine bit errors, and (B) a magnitude of the feedback signal accepted by the receiver (512).

The method follows the description set forth above as implemented by the above apparatus. Thus, the method may be selected to further include utilizing a first directional coupler (Tx Coupler) operably coupled to a mixing unit that is operably coupled to an oscillator unit, for, where the switching unit is open for a preselected test time period, utilizing a predetermined difference frequency provided by the oscillator unit to provide the difference between the first signal carrier frequency and the predetermined difference frequency between the first signal carrier frequency and the received signal carrier frequency to the receiver utilizing a second directional coupler (Rx Coupler) that is operably coupled to the receiver.

Alternatively, the method may be selected to include utilizing at least a second switching unit for, where the switching unit is open for a preselected test time period while the second switching unit is closed, providing a predetermined loopback frequency common to the transmitter and the receiver to the receiver utilizing a second directional coupler (Rx Coupler) that is operably coupled to the receiver.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. Apparatus for transceiver self-diagnostic testing in a communication system, comprising at least:
   transmitter-control unit-receiver means, comprising at least a transmitter, a control unit, and a receiver, wherein the transmitter is operably coupled to send at least a first signal having a carrier frequency and, where selected, a modulated data bit test pattern, to a switching means, the control unit is operably coupled to provide control signals to at least one of: the transmitter, the receiver, and a feedback means that provides at least a first feedback signal, and the receiver is operably coupled to receive the at least first feedback signal of the feedback means and to receive at least a first transmitted signal having a carrier frequency,
   (A) wherein the switching means is operably coupled to the control unit and one of (A1)-(A2):
      (A1) a duplexing means that is operably coupled to a single antenna, and
      (A2) a first antenna, for controlling transmission of at least the first signal to the operably coupled antenna,
   (B) where the duplexing means is selected, the duplexing means is operably coupled to the switching means, to the single antenna, and to the receiver, for permitting alternate transmission and reception by the antenna,
   (C) the feedback means is operably coupled to the transmitter for providing a feedback signal that has a frequency that is substantially one of (C1)-(C2):
      (C1) a difference between the first signal carrier frequency and a predetermined difference frequency between the first signal carrier frequency and the received signal carrier frequency, and
      (C2) a predetermined loopback frequency common to the transmitter and the receiver,
   (D) the control unit is operably coupled to the transmitter, to the receiver, to the feedback means, for, where at least one of the transmitter and the receiver further includes a synthesizer,
      (D1) opening the switching means for a preselected test time period,
      (D2) automatically programming the synthesizer(s) for providing an adjusted carrier frequency to at least one of the transmitter and the receiver for maintaining a predetermined difference frequency between the first signal carrier frequency and the received signal carrier frequency, and
      (D3) where both the transmitter and the receiver each have a synthesizer, the synthesizers providing a predetermined loopback frequency to the transmitter and the receiver,
      (D4) where the switching means is open (preventing transmission), setting the feedback means to provide a feedback signal that is one of (D4a-D4b):
         (D4a) the difference between the first signal carrier frequency and a predetermined difference frequency between the first signal carrier frequency and the received signal carrier frequency, and
         (D4b) the predetermined loopback frequency common to the transmitter and the receiver,
      (D5) such that the control unit monitors one of (D5a-D5b):
         (D5a) a difference between transmitted test information and received test information, and
         (D5b) a magnitude of the feedback signal accepted by the receiver.

2. The apparatus of claim 1 wherein the feedback means further includes at least a first directional coupler (Tx Coupler), a mixing means, an oscillator means, and a second directional coupler (Rx Coupler) wherein:

the first directional coupler (Tx Coupler) is operably coupled to the mixing means that is operably coupled to the oscillator means, for, where the switching means is open for a preselected test time period, utilizing a predetermined difference frequency provided by the oscillator means to provide the difference between the first signal carrier frequency and the predetermined difference frequency between the first signal carrier frequency and the received signal carrier frequency to the receiver utilizing the second directional coupler (Rx Coupler) that is operably coupled to the receiver.

3. The apparatus of claim 2 wherein the oscillator means is a high harmonic oscillator for providing a signal having high harmonic content to the mixing means.

4. The apparatus of claim 1 wherein the feedback means further includes at least a second switching means for, where the switching means is open for a preselected test time period while the second switching means is closed, providing the predetermined loopback frequency common to the transmitter and the receiver to the receiver utilizing a second directional coupler (Rx Coupler) that is operably coupled to the receiver.

5. The apparatus of claim 1 wherein the test information includes one of: a data bit pattern (modulated before transmission and demodulated upon receiving), a tone, and a tone sequence.

6. Apparatus for transceiver self-diagnostic testing in a communication system, comprising at least:

a transmitter that sends at least a first signal having a carrier frequency and, where selected, a modulated data bit test pattern, to a switching means, the switching means being operably coupled to a control means and one of:
a duplexing means that is operably coupled to a single antenna, and
a first antenna, for controlling transmission of at least the first signal to the operably coupled antenna, for controlling transmission of the first signal to an antenna, where the duplexing means is selected, the duplexing means being operably coupled to the switching means, to the antenna, and to a receiver, for permitting alternate transmission and reception by the antenna, mixing means, operably coupled to the transmitter utilizing a first directional coupler (Tx Coupler) and to an oscillator means, for where the switching means is open for a preselected test time period, utilizing a predetermined difference frequency provided by the oscillator means to provide a difference between the first signal carrier frequency and a predetermined difference frequency between the first signal carrier frequency and a received signal carrier frequency to the receiver utilizing a second directional coupler (Rx Coupler) that is operably coupled to the receiver, the oscillator means being operably coupled to the control means, for providing a predetermined difference frequency, the control means being operably coupled to the transmitter, to the receiver, to the switching means, and to the oscillator means, for, where at least one of the transmitter and the receiver further includes a synthesizer, opening the switching means for the preselected test time period, programming the synthesizer(s) such that an adjusted carrier frequency is provided to at least one of the transmitter and the receiver for maintaining a predetermined difference frequency between the first signal carrier frequency and the received signal carrier frequency, and where both the transmitter and the receiver each have a synthesizer, the synthesizers providing a predetermined common loopback frequency to the transmitter and the receiver, enabling the oscillator means to provide the predetermined difference frequency, such that the control means monitors one of:

a difference between the modulated data bit pattern for the first signal on a transmit loopback path (the transmitter, mixing means, receiver path) and a demodulated data bit pattern for the feedback signal to determine bit errors, a difference between a transmitted tone on the transmit loopback path and a received tone for the feedback signal, a difference between a transmitted tone sequence on the transmit loopback path and a received tone sequence for the feedback signal, and a magnitude of the feedback signal accepted by the receiver.

7. The apparatus of claim 6 wherein the oscillator means is a high harmonic oscillator for providing a signal having high harmonic content to the mixing means.

8. The apparatus of claim 6 wherein, where the transmitter and receiver are operating at a common frequency, the combined operation of the mixing means and the oscillator means is accomplished by means of a second switching means that is operably coupled to the transmitter, to the control unit and to the receiver, for controlling transmission along a transmitter-receiver (loopback) path in accordance with the control unit.

9. A method for transceiver self-diagnostic testing in a communication system, comprising at least the steps of:

providing a control signal to a switching unit that is operably coupled to a transmitter of the transceiver, providing control signals to at least one of: a transmitter synthesizer, a receiver synthesizer, and a feedback unit that provides a feedback signal, providing (by the transmitter) at least a first signal having a carrier frequency and, where selected, a modulated data bit test pattern, providing a feedback signal from the feedback unit that has a frequency that is substantially one of:

a difference between the first signal carrier frequency and a predetermined difference frequency between the first signal carrier frequency and the received signal carrier frequency, and a predetermined loopback frequency common to the transmitter and the receiver, receiving at least one of the feedback signal of the feedback unit and a received signal having a carrier frequency at the receiver, monitoring at least one of the following:

a difference between the modulated data bit pattern for the first signal and a demodulated data bit pattern for the feedback signal to determine bit errors, a difference between a transmitted tone on the transmit loopback path and a received tone for the feedback signal, a difference between a transmitted tone sequence on the transmit loopback path and a received tone sequence for the feedback signal, and a magnitude of the feedback signal accepted by the receiver.

10. The method of claim 9 further including:

utilizing a first directional coupler (Tx Coupler) operably coupled to a mixing unit that is operably coupled to an oscillator unit, for, where the switching unit is open for a preselected test time period, utilizing a predetermined difference frequency provided by the oscillator unit to provide the difference between the first signal carrier frequency and the predetermined difference frequency between the first signal carrier frequency and the received signal carrier frequency to the receiver utilizing a second directional coupler (Rx Coupler) that is operably coupled to the receiver.

11. The method of claim 10 further including the oscillator unit's providing a signal having high harmonic content to the mixing unit.

12. The method of claim 10 further including utilizing at least a second switching unit for, where the switching unit is open for a preselected test time period while the second switching unit is closed, providing a predetermined loopback frequency common to the transmitter and the receiver to the receiver utilizing a second directional coupler (Rx Coupler) that is operably coupled to the receiver.

* * * * *